United States Patent
Alassadi

(10) Patent No.: US 9,968,038 B2
(45) Date of Patent: May 15, 2018

(54) PLANT IRRIGATION SYSTEM AND METHOD OF USE

(71) Applicant: Faris Alassadi, Ann Arbor, MI (US)

(72) Inventor: Faris Alassadi, Ann Arbor, MI (US)

(73) Assignee: Faris Alassadi, Ann Arbor, MI (US)

( * ) Notice: Subject to any disclaimer, the term of this patent is extended or adjusted under 35 U.S.C. 154(b) by 0 days. days.

(21) Appl. No.: 14/866,976

(22) Filed: Sep. 27, 2015

(65) Prior Publication Data

US 2018/0054984 A1    Mar. 1, 2018

(51) Int. Cl.
   *A01G 27/00* (2006.01)

(52) U.S. Cl.
   CPC .......... *A01G 27/003* (2013.01); *A01G 27/001* (2013.01); *A01G 27/006* (2013.01)

(58) Field of Classification Search
   CPC ...... A01G 29/00; A01G 27/006; A01G 27/00; A01G 27/003
   USPC .................................. 47/48.5, 21.1
   See application file for complete search history.

(56) References Cited

U.S. PATENT DOCUMENTS

| | | | | |
|---|---|---|---|---|
| 612,745 A | * | 10/1898 | Morris | A01M 21/043 |
| | | | | 111/7.2 |
| 872,359 A | | 12/1907 | Lowry | |
| 1,226,758 A | | 5/1917 | Dufty | |
| 1,562,542 A | | 11/1925 | Cox | |
| 1,834,381 A | | 12/1931 | Caps | |
| 2,909,328 A | | 11/1959 | Babyak | |
| 2,986,842 A | * | 6/1961 | Toulmin, Jr. | A01G 7/045 |
| | | | | 239/557 |
| 3,026,827 A | | 3/1962 | Cunningham | |
| 3,195,818 A | * | 7/1965 | Herberg | B05B 1/20 |
| | | | | 138/89 |
| 3,206,892 A | * | 9/1965 | Telkes | A01G 9/20 |
| | | | | 47/19.1 |
| 3,216,663 A | | 11/1965 | Framton et al. | |
| 3,711,992 A | * | 1/1973 | Martin | A01G 29/00 |
| | | | | 47/48.5 |
| 3,757,469 A | | 9/1973 | Smith et al. | |
| 3,856,205 A | | 12/1974 | Rohling | |
| 3,876,146 A | | 4/1975 | Pacheco | |
| 4,079,547 A | * | 3/1978 | Walker | A01G 31/02 |
| | | | | 47/21.1 |
| 4,169,420 A | * | 10/1979 | Kresge, Sr. | A01C 21/00 |
| | | | | 111/7.1 |
| 4,223,837 A | | 9/1980 | Gubbiotti | |
| 4,223,840 A | | 9/1980 | La Scala et al. | |

(Continued)

FOREIGN PATENT DOCUMENTS

| | | |
|---|---|---|
| EP | 0676133 A1 | 4/1995 |
| EP | 2489794 A1 | 2/2012 |
| GB | 2179834 A  * 3/1987 | ............. A01G 9/122 |

*Primary Examiner* — Son T Nguyen

(57) ABSTRACT

A plant irrigation system and method of use, wherein the system accepts a fluid and releases it over time to one or more plants. The system can be fed manually or via an irrigation network capable of feeding fluid to one or more containers. The irrigation network can feed fluid automatically or manually. Fluid flow into each individual container is controlled via a float valve or level switch. Fluid exits the container and waters the ground immediately below via a fluid release valve that can be manually set, regulating the flowrate out of the container. The containers are above the ground, each mounted upon a stake, and utilize a flexible impermeable membrane.

7 Claims, 4 Drawing Sheets

(56) References Cited

U.S. PATENT DOCUMENTS

| | | | | |
|---|---|---|---|---|
| 4,267,665 A | * | 5/1981 | Wallace | A01G 13/043 47/2 |
| 4,291,836 A | * | 9/1981 | Chen-Hsiung | A01G 27/001 137/132 |
| 4,336,666 A | | 6/1982 | Caso | |
| 4,502,244 A | | 3/1985 | Yoham | |
| 4,624,194 A | * | 11/1986 | Zinck | A01B 79/00 111/7.2 |
| 4,685,827 A | | 8/1987 | Sibbel | |
| 4,704,818 A | * | 11/1987 | Cameron | A01G 9/022 47/48.5 |
| 4,846,206 A | | 7/1989 | Peterson | |
| 4,932,157 A | | 6/1990 | Shimp | |
| 4,938,420 A | | 7/1990 | Ruttenberg | |
| 5,067,272 A | * | 11/1991 | Constantz | A01G 25/00 202/234 |
| 5,137,175 A | * | 8/1992 | Kowalski | B67D 1/0462 141/114 |
| 5,142,818 A | | 9/1992 | Weigert | |
| 5,148,628 A | | 9/1992 | Wulkowicz | |
| 5,174,477 A | * | 12/1992 | Schafer | F41B 9/0009 141/18 |
| 5,201,860 A | * | 4/1993 | Richardson | A01G 29/00 47/39 |
| 5,212,905 A | | 5/1993 | Philoctete | |
| 5,231,793 A | | 8/1993 | Allen | |
| 5,301,633 A | * | 4/1994 | Lloyd | A01K 67/0332 119/6.7 |
| 5,364,034 A | | 11/1994 | Hirahara | |
| 5,381,956 A | * | 1/1995 | Robinson | B05B 17/08 137/132 |
| 5,542,605 A | | 8/1996 | Campau | |
| 5,558,030 A | * | 9/1996 | Ward | A01G 29/00 111/7.2 |
| 5,634,592 A | | 6/1997 | Campau | |
| 5,850,972 A | | 12/1998 | Campau | |
| 6,023,883 A | | 2/2000 | Bacon, Jr. | |
| 6,108,970 A | * | 8/2000 | Ball | A01G 13/0243 47/48.5 |
| 6,226,920 B1 | | 5/2001 | Myers | |
| 6,516,562 B2 | | 2/2003 | Astle | |
| 6,659,366 B1 | * | 12/2003 | Walters | B05B 9/0838 222/206 |
| 6,769,213 B1 | | 8/2004 | Cardarelli | |
| 7,198,431 B2 | | 4/2007 | Gesser | |
| 7,712,253 B2 | | 5/2010 | Gesser et al. | |
| 7,730,666 B2 | | 6/2010 | Spray | |
| 7,823,326 B2 | | 11/2010 | Hui | |
| 7,845,110 B2 | | 12/2010 | Amsellem | |
| 8,096,491 B2 | | 1/2012 | Lutzki et al. | |
| 8,511,585 B2 | | 8/2013 | Keren | |
| 8,628,032 B2 | | 1/2014 | Feith et al. | |
| 8,794,539 B2 | | 8/2014 | Ruttenberg | |
| 9,062,795 B2 | | 6/2015 | Guthrie | |
| 2004/0206771 A1 | * | 10/2004 | Junkel | F41B 9/0009 222/78 |
| 2005/0072862 A1 | | 4/2005 | Skinner | |
| 2005/0246952 A1 | * | 11/2005 | Downey | A01G 25/02 47/48.5 |
| 2007/0194149 A1 | | 8/2007 | Mavrakis et al. | |
| 2007/0267515 A1 | * | 11/2007 | Sargent | A01G 27/003 239/63 |
| 2007/0278330 A1 | | 12/2007 | Lin | |
| 2008/0092440 A1 | * | 4/2008 | Johnson | A01G 13/0212 47/48.5 |
| 2008/0135647 A1 | | 6/2008 | France et al. | |
| 2010/0219265 A1 | | 9/2010 | Feld | |
| 2012/0083929 A1 | | 4/2012 | Conrad, Jr. | |
| 2012/0216457 A1 | | 8/2012 | Robb | |
| 2013/0056561 A1 | | 3/2013 | Freels | |
| 2013/0341431 A1 | | 12/2013 | Ensworth et al. | |
| 2014/0034753 A1 | | 2/2014 | Mavrakis et al. | |
| 2014/0110506 A1 | | 4/2014 | Mavrakis et al. | |
| 2014/0283445 A1 | | 9/2014 | Chabot | |
| 2014/0298719 A1 | | 10/2014 | Mackin | |
| 2014/0373443 A1 | | 12/2014 | Liu et al. | |
| 2014/0374502 A1 | | 12/2014 | Nourian | |
| 2015/0041563 A1 | | 2/2015 | Ensworth et al. | |
| 2015/0189841 A1 | | 7/2015 | Hamann et al. | |
| 2015/0208596 A1 | | 7/2015 | Whitcomb | |

* cited by examiner

PLANT IRRIGATION SYSTEM AND METHOD OF USE

TECHNICAL FIELD

The present technology relates to irrigation systems. More particularly, the disclosure discusses an irrigation system for plants.

BACKGROUND

The statements in this section merely provide background information related to the present disclosure. Accordingly, such statements are not intended to constitute an admission of prior art.

Many times a plant needs to be watered but a plant owner is unavailable to provide the water due to an extended absence. This can be especially troublesome for younger plants that are growing at a fast pace and need consistent water. Hence, a need has existed to provide consistent slow watering for plants, otherwise known as drip irrigation. In addition, there exists a need to water plants in a more efficient manner in locations where the water supply is limited.

U.S. Pat. No. 6,226,920, PLANT WATERING DEVICE, granted to Myers is one attempt to solve the need for drip irrigation. The Myers patent describes a receptacle with a hollow interior in the shape of a character and configured to rest upon the ground.

BRIEF SUMMARY OF THE INVENTION

The present disclosure describes a plant irrigation system, the system comprising one or more device(s), wherein each device comprises: a container; a stake configured to be inserted into a surface, wherein the stake passes through a top of the container and a bottom of the container; a top retaining clip which attaches the stake to the top of the container; a bottom retaining clip which attaches the stake to the bottom of the container; an outlet valve attached to a bottom area of the container; and an inlet valve attached to a top area of the container.

A method for watering a plant, the method comprises: inserting a stake of a device into a ground area near a plant, wherein the device comprises: a container; the stake, wherein the stake passes through a top of the container and a bottom of the container; a top retaining clip which attaches the stake to the top of the container; a bottom retaining clip which attaches the stake to the bottom of the container; an outlet valve attached to a bottom area of the container; and an inlet valve attached to a top area of the container; filling the container with water via the inlet valve; and releasing water from the container onto the ground area via the outlet valve.

In one embodiment, the device(s) further comprise a flow tube attached to the top area of the container and configured to allow fluid to flow into the container via a flow opening.

In one embodiment, the device(s) further comprise a float valve inside the container, wherein the float valve is configured to restrict fluid flow into the container coming from the flow tube.

In one embodiment, the float valve comprises a ball configured to float upon a fluid surface within the container and plug the flow opening when the fluid surface nears the flow opening.

In one embodiment, there is more than one device and each device is independently attached to a fluid flow network configured to add fluid to each device.

In one embodiment, the container comprises a flexible impermeable membrane.

In one embodiment, the membrane is elastic.

The container can be a bag with a plastic material of construction.

The stake can be inserted into soil or the ground.

The outlet valve can be manually operated and manually adjusted to regulate the flowrate of fluid onto the ground.

The inlet valve can have a fitting enabling easy attachment to a hose or similar fluid filling means.

The retaining clips can be metal, elastic, plastic, or the like. The retaining clips attach the container to the stake with enough force to prevent fluid leaking from the container.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

As discussed in the background, there exists a need for a drip irrigation solution. The Myers patent discussed in the background provides a device which creates other problems for the plant owner. The device rests upon the ground and takes up valuable surface area. Furthermore, the device uses a static receptacle that always utilizes the same amount of volume.

In contrast, the present disclose provides a drip irrigation system that overcomes the deficiencies of Myers. The system uses one or more devices, each device upon a stake that is inserted into the ground. This minimizes ground cover and enables soil aeration.

Each device in the present disclosure also utilizes a container that is a flexible membrane such as a bag. The membrane can be elastic and is configured retract and to minimize sun blockage of a plant when the membrane is not filled with fluid.

Figures 1, 2:
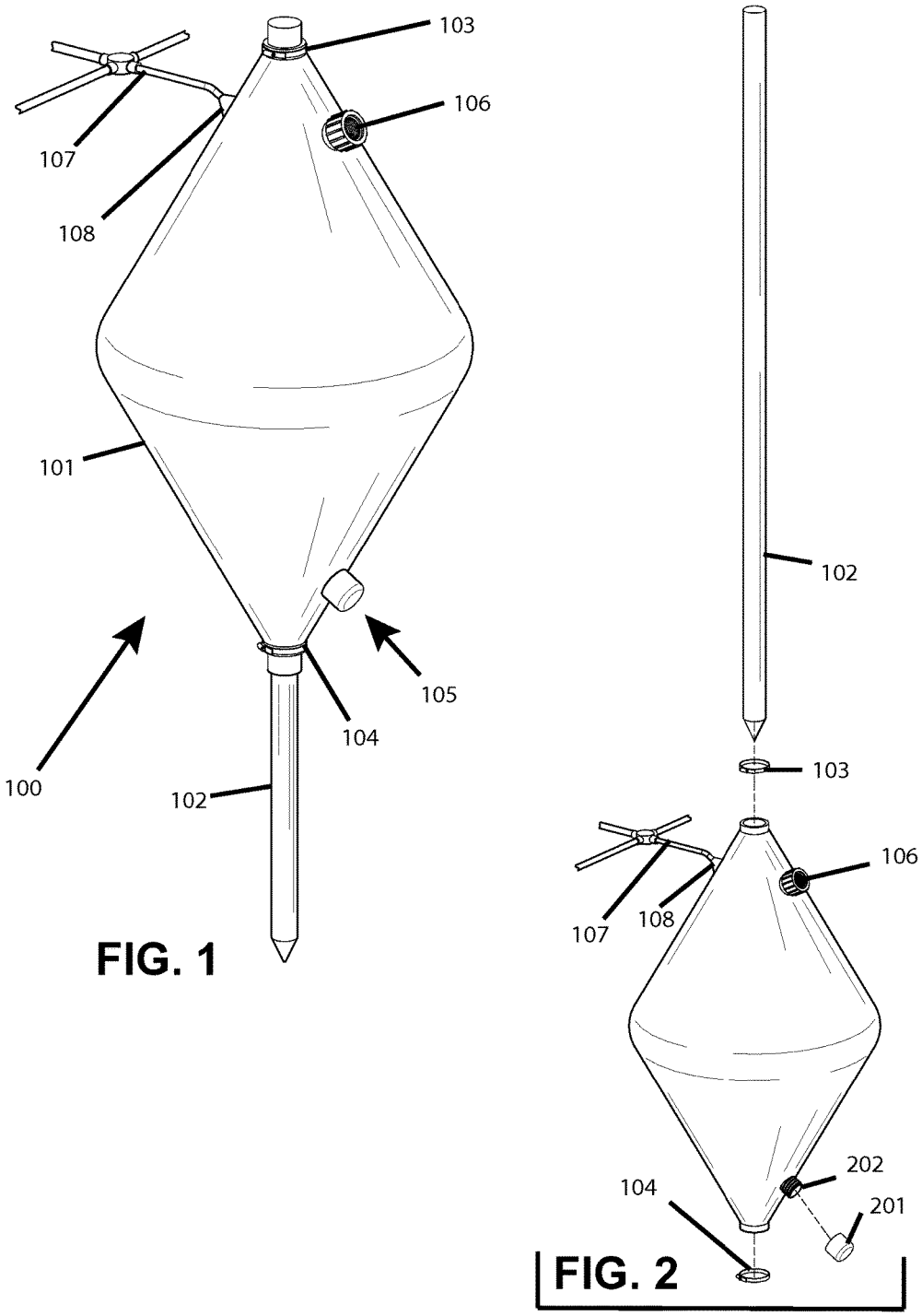
FIG. 1 shows a perspective view of a plant irrigation system embodiment.
FIG. 2 shows an exploded view of a plant irrigation system embodiment.

FIG. 1 shows a perspective view of a plant irrigation system embodiment. Shown are a plant irrigation device 100, container 101, stake 102, top retaining clip 103, a bottom retaining clip 104, outlet valve 105, inlet valve 106, flow tube 107, and flow opening 108. The stake 102 is inserted into the ground near a plant. Water can either enter through the flow tube 107 via the flow opening 108 or through the inlet valve 106. Water is released to the ground area via outlet valve 105. The flowrate of the water coming out of the outlet valve 105 can be manually adjusted via the outlet valve 105 and can range from 0-2 gallons per minute. In a separate embodiment, the flowrate of the water coming out of the outlet valve 105 can be manually adjusted via the outlet valve 105 and can range from one gallon per fifteen minutes (completely open) to one gallon per three hours.

FIG. 2 shows an exploded view of a plant irrigation system embodiment. Shown are a plant irrigation device 100, container 101, stake 102, top retaining clip 103, a bottom retaining clip 104, outlet valve 105, inlet valve 106 (comprising outlet valve cap 201 and threaded opening 202), flow tube 107, and flow opening 108. The outlet valve cap 201 is adjusted on the threaded opening 202 to regulate the flowrate of fluid out of the device 100.

Figure 3:
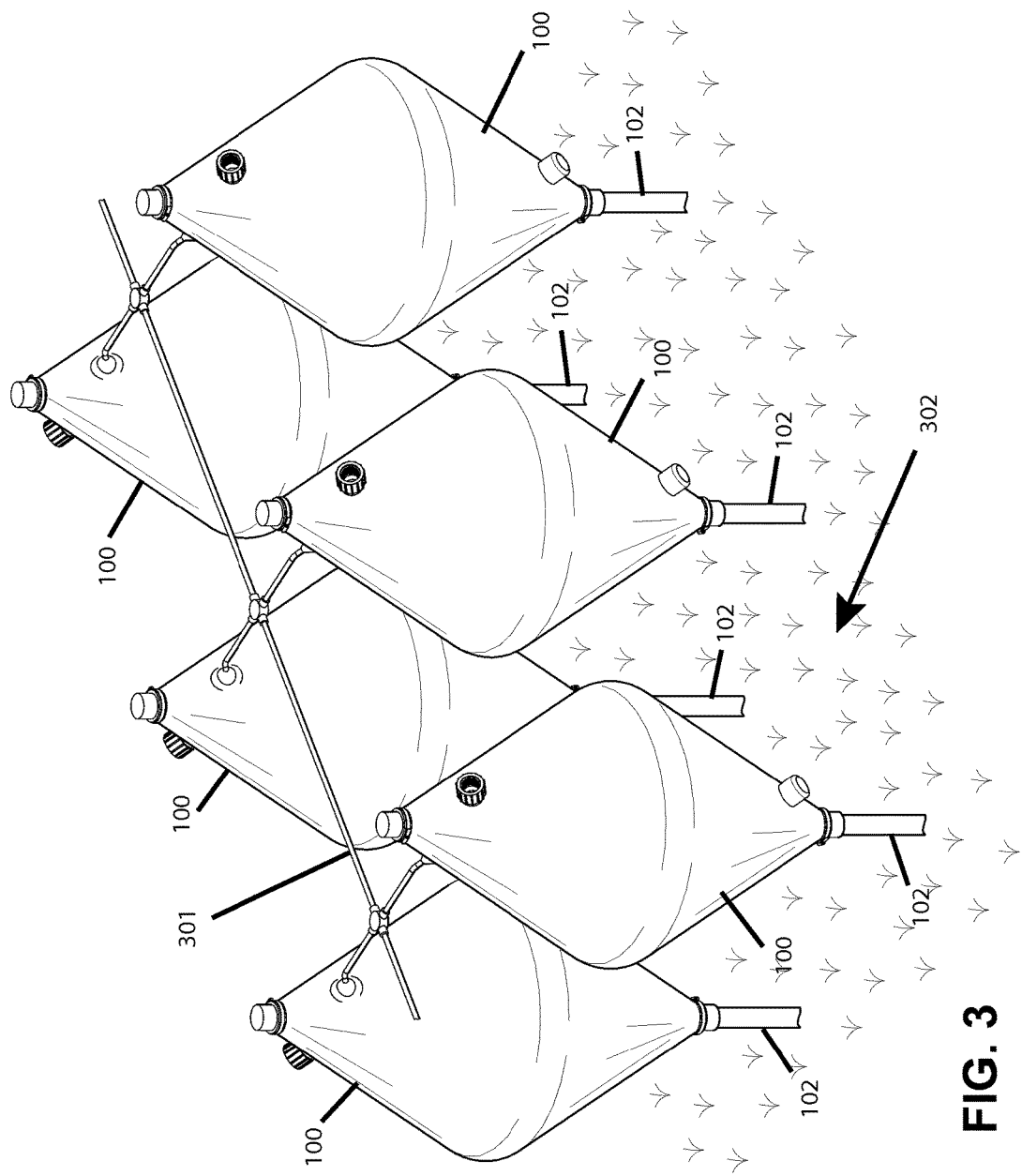
FIG. 3 shows a perspective view of a plant irrigation system embodiment wherein the system is expanded and configured to water multiple plants.

FIG. 3 shows a perspective view of a plant irrigation system embodiment wherein the system is expanded and configured to water multiple plants. Shown are multiple plant irrigation devices 100 (six of them) connected via fluid flow network 301. The stakes 102 of each device 100 are inserted into the ground area 302.

Figure 4:
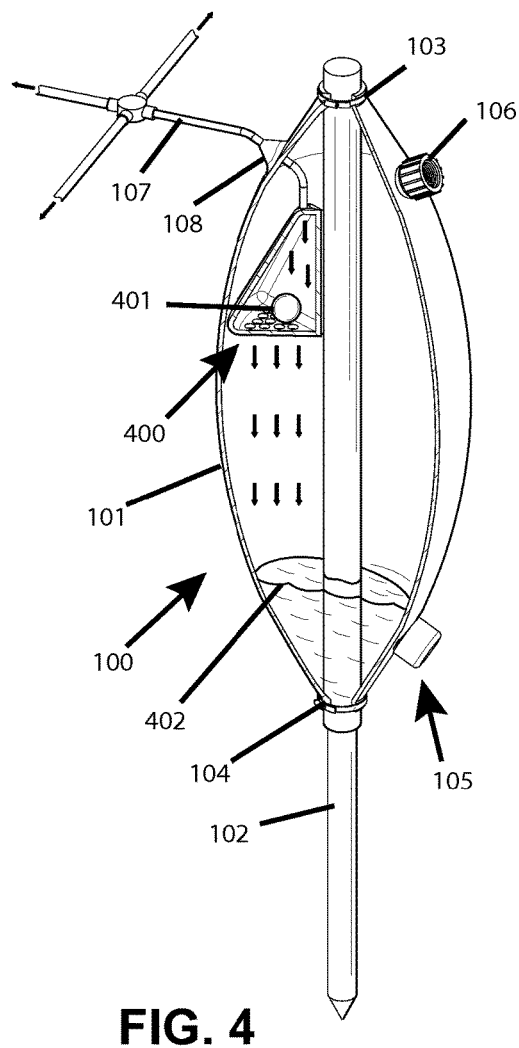
FIG. 4 shows a perspective cut-away view of a plant irrigation system embodiment with the system slightly-filled with a liquid.

FIG. 4 shows a perspective cut-away view of a plant irrigation system embodiment with the system slightly-filled with a liquid. Shown are a plant irrigation device 100, container 101, stake 102, top retaining clip 103, a bottom retaining clip 104, outlet valve 105, inlet valve 106, flow tube 107, and flow opening 108, float valve 400, ball 401, and fluid surface 402. Since the fluid surface 402 is below the level of the float valve 400, the ball 400 rests upon the bottom of the float valve and the fluid flow into the container is not restricted. Note that a flexible membrane material of construction is used for container 101 and that the membrane is tapered from the fluid surface 402 to the top retaining clip 103.

Figure 5:
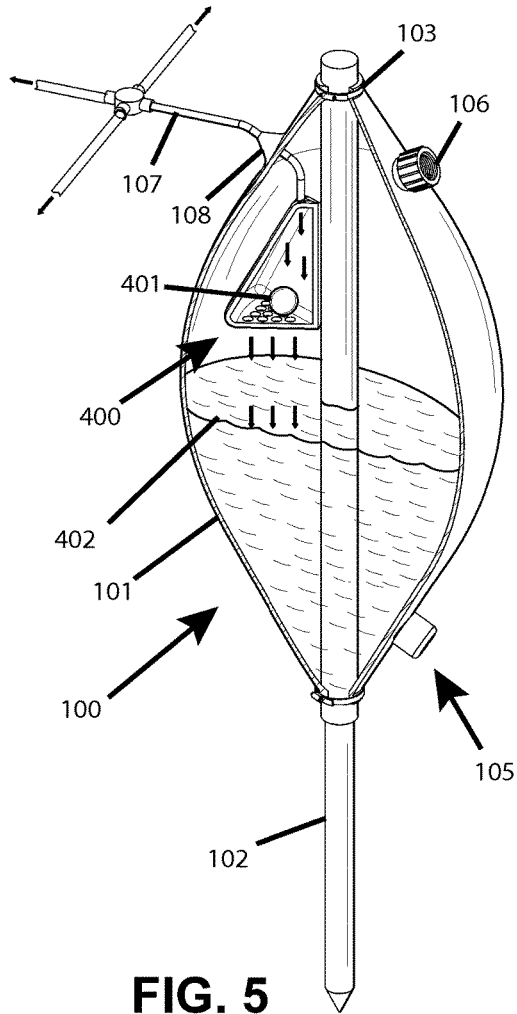
FIG. 5 shows a perspective cut-away view of a plant irrigation system embodiment with the system partially-filled with a liquid.

FIG. 5 shows a perspective cut-away view of a plant irrigation system embodiment with the system partially-filled with a liquid. Shown are a plant irrigation device 100, container 101, stake 102, top retaining clip 103, a bottom retaining clip 104, outlet valve 105, inlet valve 106, flow tube 107, and flow opening 108, float valve 400, ball 401, and fluid surface 402. Since the fluid surface 402 is below the level of the float valve 400, the ball 400 rests upon the bottom of the float valve and the fluid flow into the container is not restricted. Note that a flexible membrane material of construction is used for container 101 and that the membrane is tapered from the fluid surface 402 to the top retaining clip 103.

Figure 6:
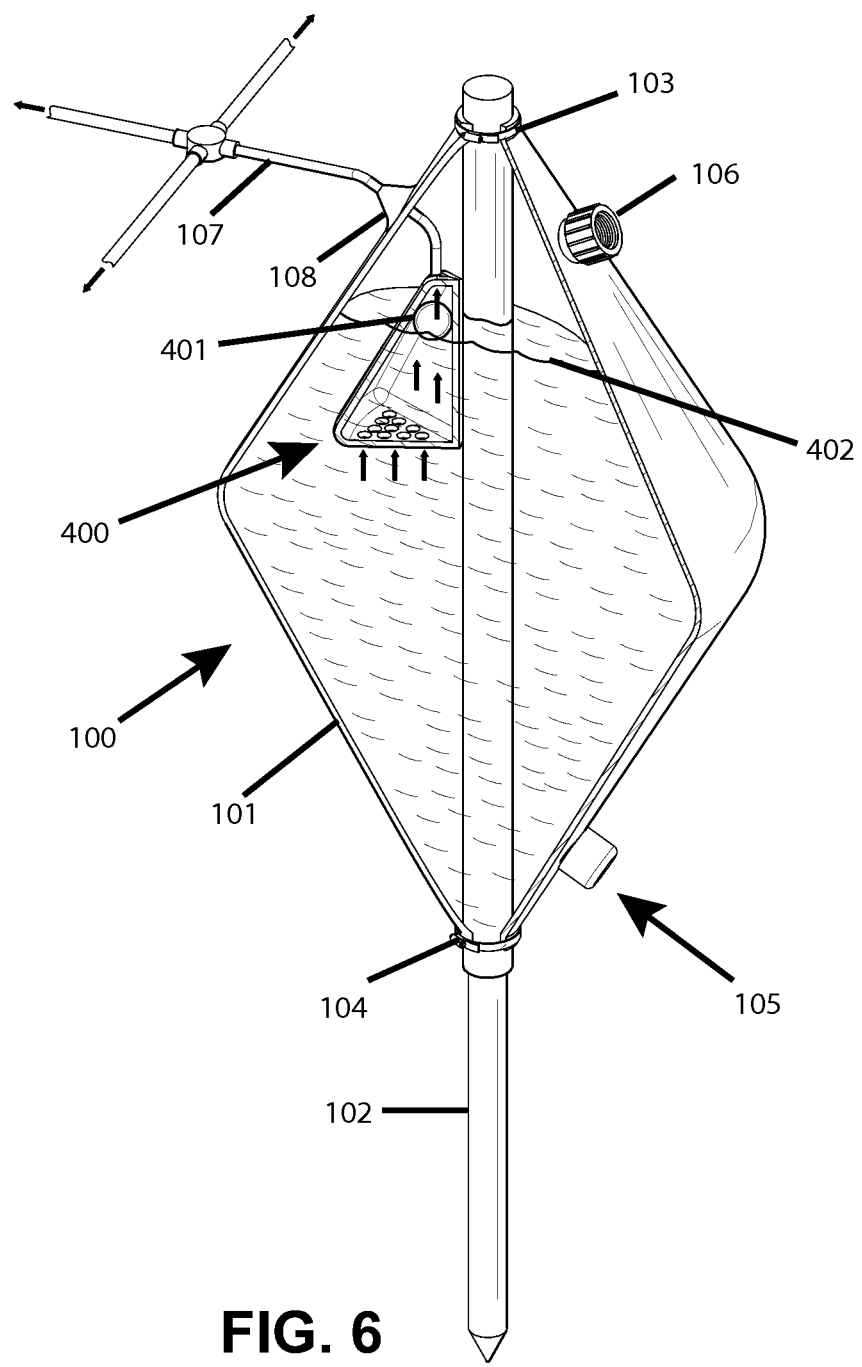
FIG. 6 shows a perspective cut-away view of a plant irrigation system embodiment with the system mostly-filled with a liquid.

FIG. 6 shows a perspective cut-away view of a plant irrigation system embodiment with the system mostly-filled with a liquid. Shown are a plant irrigation device 100, container 101, stake 102, top retaining clip 103, a bottom retaining clip 104, outlet valve 105, inlet valve 106, flow tube 107, and flow opening 108, float valve 400, ball 401, and fluid surface 402. Since the fluid surface 402 is within the level of the float valve 400, the ball 400 rests upon the fluid surface 402 and the fluid flow into the container is about to be restricted. Fluid flow into the container 101 will be restricted by the ball 401 utilizing the buoyant pressure of the fluid within the container. The ball 401 blocks the flow opening 108. Note that the ball 401 and the flow opening 108 have a matching shape to facilitate easier seating of the ball 401 into the flow opening 108. Also note that a flexible membrane material of construction is used for container 101 and that the membrane is tapered from the fluid surface 402 to the top retaining clip 103.

All patents and publications mentioned in the prior art are indicative of the levels of those skilled in the art to which the invention pertains. All patents and publications are herein incorporated by reference to the same extent as if each individual publication was specifically and individually indicated to be incorporated by reference, to the extent that they do not conflict with this disclosure.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements.

I claim:

1. A plant irrigation device comprising:
a flexible container adapted to store fluid;
a post extending through a top and a bottom of the flexible container at a center of the flexible container, wherein the substantially solid post is configured to rest on or be inserted into ground near a plant;
a top retaining clip that attaches the top of the flexible container to the substantially solid post;
a bottom retaining clip that attaches the bottom of the flexible container to the substantially solid post;
an outlet valve attached to a bottom area of the flexible container; and
a flow opening in a top area of the flexible container a flow tube attached to the flow opening and configured to allow the fluid to flow into the flexible container via the flow opening; a float valve within a housing inside the flexible container, wherein the float valve is configured to restrict flow of the fluid into the flexible container via the flow opening, wherein the float valve comprises a ball configured to float upon a surface of the fluid within the housing of the flexible container and plug the flow opening when the surface of the fluid nears the flow opening; wherein the flexible container comprises an impermeable membrane, wherein the impermeable membrane is elastic.

2. The plant irrigation device of claim 1, wherein the housing suspends the ball above the surface of the fluid when the surface of the fluid is spaced a distance below a bottom of the housing.

3. The plant irrigation device of claim 1, wherein the top and bottom areas of the flexible container have substantially conical configurations.

4. The plant irrigation device of claim 3, wherein the top retaining clip is adjacent to a top tip of the substantially conical configuration of the top area, and the bottom retaining clip is adjacent to a bottom tip of the substantially conical configuration of the bottom area.

5. The plant irrigation device of claim 4, wherein the substantially solid post extends through the top tip of the substantially conical configuration of the top area and the bottom tip of the substantially conical configuration of the bottom area.

6. The plant irrigation device of claim 3, wherein the substantially solid post extends through a top tip of the substantially conical configuration of the top area and a bottom tip of the substantially conical configuration of the bottom area.

7. A method for watering a plant, the method comprising:
   providing the plant irrigation device as claimed in claim 1; placing the post on a ground area near a plant;
   filing the flexible container with water via the flow opening; and
   releasing the water from the flexible container onto the ground area near the plant via the outlet valve, wherein the outlet valve is spaced a vertical distance above the plant.

* * * * *